(12) United States Patent
Oberle et al.

(10) Patent No.: US 7,798,033 B2
(45) Date of Patent: Sep. 21, 2010

(54) POWER-ASSISTED STEERING HAVING A GEAR MECHANISM

(75) Inventors: Stephan Oberle, Villingen-Schwenningen (DE); Bernd Enzmann, Villingen-Schwenningen/Tannheim (DE)

(73) Assignee: IMS Gear GmbH, Donaueschingen (DE)

( * ) Notice: Subject to any disclaimer, the term of this patent is extended or adjusted under 35 U.S.C. 154(b) by 367 days.

(21) Appl. No.: 10/714,410

(22) Filed: Nov. 14, 2003

(65) Prior Publication Data

US 2004/0134300 A1   Jul. 15, 2004

(30) Foreign Application Priority Data

Nov. 14, 2002  (DE)  ................. 102 53 349
Mar. 28, 2003  (DE)  ................. 103 14 107

(51) Int. Cl.
  F16H 35/00  (2006.01)
  F16H 1/16   (2006.01)
  F16H 1/20   (2006.01)

(52) U.S. Cl. ..................................... 74/388 PS; 74/425
(58) Field of Classification Search .............. 74/388 PS, 74/425, 89.14, 458, 462
See application file for complete search history.

(56) References Cited

U.S. PATENT DOCUMENTS

| | | | | |
|---|---|---|---|---|
| 2,279,414 A | * | 4/1942 | Scott | ........................... 74/458 |
| 2,760,381 A | * | 8/1956 | Pickles | ........................ 74/458 |
| 4,121,482 A | * | 10/1978 | Ishikawa et al. | .............. 74/462 |
| 5,829,305 A | * | 11/1998 | Ham et al. | .................. 74/89.14 |
| 6,247,376 B1 | * | 6/2001 | Zhou et al. | ..................... 74/425 |
| 6,357,313 B1 | * | 3/2002 | Appleyard | .............. 74/388 PS |
| 6,543,569 B1 | * | 4/2003 | Shimizu et al. | ............. 180/444 |
| 6,776,064 B2 | | 8/2004 | Bucholz et al. | |

FOREIGN PATENT DOCUMENTS

| | | | | |
|---|---|---|---|---|
| EP | 0 117 465 | 9/1984 | | ...................... 1/16 |
| JP | 5629147 | 7/1981 | | ...................... 55/8 |
| JP | 02015743 | 1/1990 | | .................... 12/42 |
| JP | 07215227 | 8/1995 | | ........................ 5/4 |
| JP | 09024855 | 1/1997 | | |
| JP | 09263250 | 10/1997 | | ........................ 5/4 |
| JP | 2000314464 | 11/2000 | | .................... 55/22 |
| JP | 2001163228 | 6/2001 | | ...................... 3/12 |
| WO | WO9215802 | 9/1992 | | |
| WO | WO 96/37399 | 11/1996 | | |

OTHER PUBLICATIONS

Shigley, et al., Mechanical Engineering Design, McGraw Hill, 7th ed. p. 797.*

* cited by examiner

*Primary Examiner*—Thomas R Hannon
*Assistant Examiner*—Justin Krause
(74) *Attorney, Agent, or Firm*—O'Shea Getz P.C.

(57) ABSTRACT

A power-assisted steering system includes a gear mechanism, coupled to a steering column, with a gear and a mating gear. The two transmission gears have teeth (4, 5) via which they engage with each other, movement and power being transmitted from one gear to the other gear via effective profiles of their tooth faces (11, 12). In order to provide a gear mechanism that has an enhanced load-bearing capacity and at the same time can be manufactured in a simple and economical way, the effective profiles of the tooth faces (11, 12) of the gear and the mating gear contact over the height ($h_4$, $h_5$) of the teeth (4, 5).

13 Claims, 4 Drawing Sheets

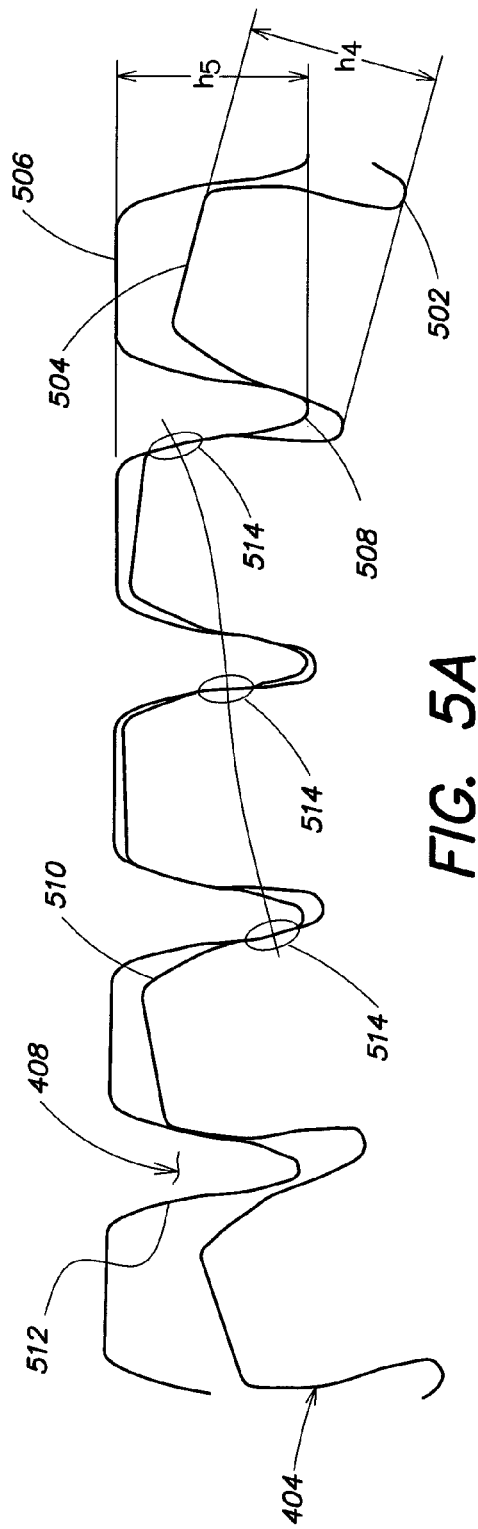
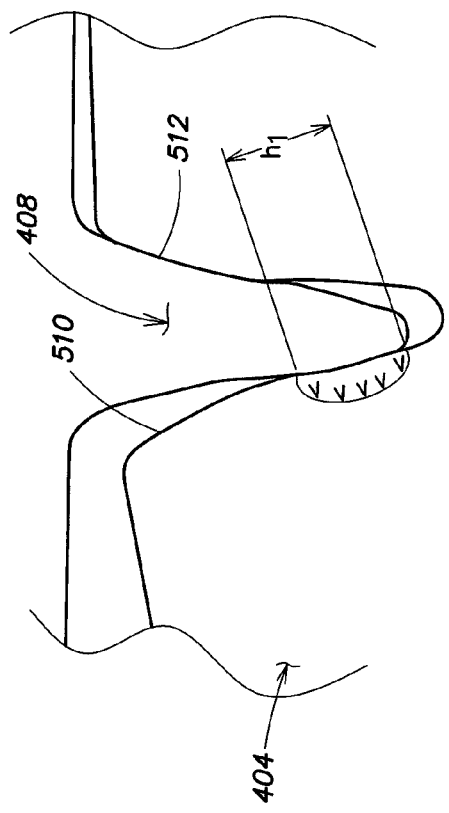
FIG. 5A
FIG. 5B

POWER-ASSISTED STEERING HAVING A GEAR MECHANISM

BACKGROUND OF THE INVENTION

The present invention relates to the field of steering mechanisms, and in particular to a power-assisted steering system having a gear mechanism with a gear and a mating gear.

Power-assisted steering is regularly used in motor vehicles to assist with manual steering movements that a driver performs on the steering wheel. Power-assisted steering systems include hydraulics to minimize the steering forces and reduce steering, especially at low speeds or when the vehicle is stationary. Power-assisted steering improves driver comfort, especially in parking and maneuvering, and in city traffic. In addition, steering systems are being developed that are electrical rather than hydraulic systems.

FIG. 1 is a pictorial illustration of a power-assisted steering system 100 with electromechanical steering assistance. FIG. 1 depicts a steering wheel 102 connected via a steering column 104 to a gear mechanism that has a worm gear 106 and a worm 108. In addition, a worm-drive electric motor 110 is coupled to the gear mechanism. This gear mechanism is connected via a drag link 112 to a steering rack 114 of the motor vehicle. A tie rod 116 is coaxial with the steering rack 114.

Gear mechanisms generally transmit a rotary movement of one shaft to another, which frequently occurs with conversion of a torque. Through teeth meshing with one another, positive connection between the shafts is provided and gear mechanisms ensure compulsory, non-slip transmission of the rotary movement, or torque.

Gears with involute tooth design are in almost exclusive use in mechanical engineering. In an involute tooth design, the effective profiles of the tooth faces (i.e., the tooth face profiles that come into contact with one another when the teeth mesh and through which force is transmitted) are involutes of a circle. That is, they describe a curve obtained by constructing a tangent at points of a circle and deducting on the tangents the length of the arc from the point of contact of the tangent with the circle up to a certain fixed point of the circle. In the case of externally toothed gears, the effective profiles of an involute tooth design are convex.

Gears with involute tooth design can be made in a relatively simple and precise manner. An advantage of this tooth geometry is that various tooth shapes and axis spacings can be made with the same tool by shifting the profile. In operation, gears with involute tooth design are distinguished by the fact that the direction and the magnitude of the tooth normal force is constant during the engagement of the teeth, resulting in uniform loading of the entire mechanism, in particular of the bearings of the mechanism.

Gear mechanisms have a variety of uses. They are used both in precision technology and in vehicle construction, for example in steering assistance systems.

FIG. 2 depicts a worm drive 200 with a spur-gear-shaped worm gear 202 and a worm 204 engaging with the worm gear 202, each with involute tooth design. In operation (i.e., when the teeth of the worm 204 and the worm gear 202 mesh with one another) the teeth of the worm gear 202 make contact with the teeth of the worm 204 at a point 206. This contact leads to a high loading of the teeth at this point 206, which, depending on the material pairing, can lead to severe wear and, in the extreme case, overloading of the teeth. The load-bearing capacity of gears with a point contact is thus limited.

FIG. 3 depicts a worm gear mechanism 300 having a worm gear 302 and a worm 304 that engages the worm gear 302. In contrast to the worm gear mechanism depicted in FIG. 2, the worm gear 302 is globoidal rather than cylindrical in shape. As a result, the worm gear 302 contact with the worm 304 is along a line 306 over the width of the teeth, so that the load transmitted by the teeth is distributed over a larger area. This reduces the loading per unit area of the individual teeth, so that the load-bearing capacity of the gears is increased. As a consequence, both wear and the danger of overloading of the teeth are decreased.

Machining is required to make a globoidal worm gear, since globoidal worm gears have undercut regions. However, machining increases the cost of manufacturing in comparison to other techniques for making gears, such as for example injection molding. In addition, the assembly of worm gear mechanisms with globoidal worm gears is more expensive because the worm gear can only be mounted in the radial direction, and not in the axial direction. Radial insertion of the worm gear requires more space than axial insertion, and may damage the worm gear if the worm gear is not moved toward the worm in the correct angular position. This is particularly true when the worm gear is made of a material with lower strength than the material of the worm. In addition, the worm and the worm gear must be positioned precisely relative to each other so that the teeth mesh properly. Another drawback is that if the angle between the axes of the worm and the worm gear is not equal to 90°, the worm gear must be made less globoidal. As a result, the linear contact area 306 becomes smaller, which in turn has a negative effect on the load-bearing capacity.

German Patent DE4107659A1 discloses a worm gear mechanism in which the worm and the worm gear have their force-transmitting contact surfaces shaped to provide low-noise operation. The tooth bases are each concave in shape and the tooth tips are convex in shape. An involute middle tooth part is provided in each case between these concave and convex portions. However, the use of the involute middle tooth part leads to the situation that only a point contact is provided between the meshing teeth in the involute region. As a result, this known worm gear mechanism does not have adequate bearing capacity for high loads throughout their meshing region.

Therefore, there is a need for a power-assisted steering system that includes gears with improved coupling.

SUMMARY OF THE INVENTION

A power-assisted steering system includes a gear mechanism with a gear and a mating gear that engage with each other via teeth. The teeth have effective profiles that are matched to each other such that the contact is relatively linear over the height of the teeth. That is, the face shape is adapted over the height of a tooth to the face shape of the tooth meshing with this tooth in such a way that the curvatures of the face shapes over the height of the teeth are selected such that a concavity is assigned a corresponding convexity on the other tooth, and vice versa. In relation to point contacts as common in the prior art, a linear contact has an advantage that the load to be transmitted by one gear to the other gear is distributed over a larger area, so that the load per unit area of the teeth is decreased.

In this way, both the wear of the gears and the danger of overloading are reduced. Overall, the load-bearing capacity of the gears is thus increased. The high load-bearing and loading capacity of the mechanism is achieved through the practice of providing no involute region at all for engagement of the teeth.

A linear contact over the height of the teeth can be achieved for example by assigning to a concave region of one tooth a convex region of the tooth in engagement with this tooth, the concave region and the convex region having the same curvature. The tooth base is made concave in shape and the tooth tip is made convex in shape, the convex region making a transition to the concave region without the interposition of a further region such as, for example, an involute region.

The worm gear may be made of a material with a lower strength than the material of the worm. For example, the worm may be made of steel and the worm gear of plastic. The use of a worm gear made of plastic brings about advantages that relate to fabrication. Plastic gears can be made by the economical injection molding process without the need for subsequent machining.

The tooth thicknesses of the wheels can be optimized because of the reduction of a real load per tooth. Especially good optimization results from utilizing the material properties of the material pairings. The tooth thicknesses of the worm gear are preferably greater than the tooth thicknesses of the worm. A reduction in the tooth thicknesses in turn yields cost advantages because material can be saved in this way.

The worm gear may be cylindrical in shape. In contrast to globoidal worm gears, a cylindrical worm gear has no undercuts. This form of worm gear favors the making of the worm gears by injection molding, which in turn has a positive impact on costs. In addition, the assembly of worm gear mechanisms with cylindrical worm gears is simpler because the worm gear can also be mounted in the axial direction. No additional space is required for axial insertion. The danger of damage to the worm gear is greatly reduced with axial insertion as compared to radial insertion. Further, exact axial positioning of the worm gear relative to the worm is not required, so that the cost of assembly is further reduced. What is more, axis angles different from 90° can be set with a cylindrical worm gear without any change in the load-bearing capacity of the gears, because the size of the contact area remains constant.

If the worm is made globoidal in shape, the contact over the width of the teeth is enlarged. A larger contact additionally reduces the load per unit area, so that the load-bearing capacity of the gears is further increased.

Although the invention is intended and suitable principally for use in power-assisted steerings of motor vehicles, the invention is not limited hereto. Instead, the gear mechanism of the present invention can also be used in window-opening drives, seat adjustments, mass compensation mechanisms, or other adjustment drives.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 5A-5B depict the tooth geometry of the worm gear mechanism of FIG. 4;

DETAILED DESCRIPTION OF THE INVENTION

Figure 1:
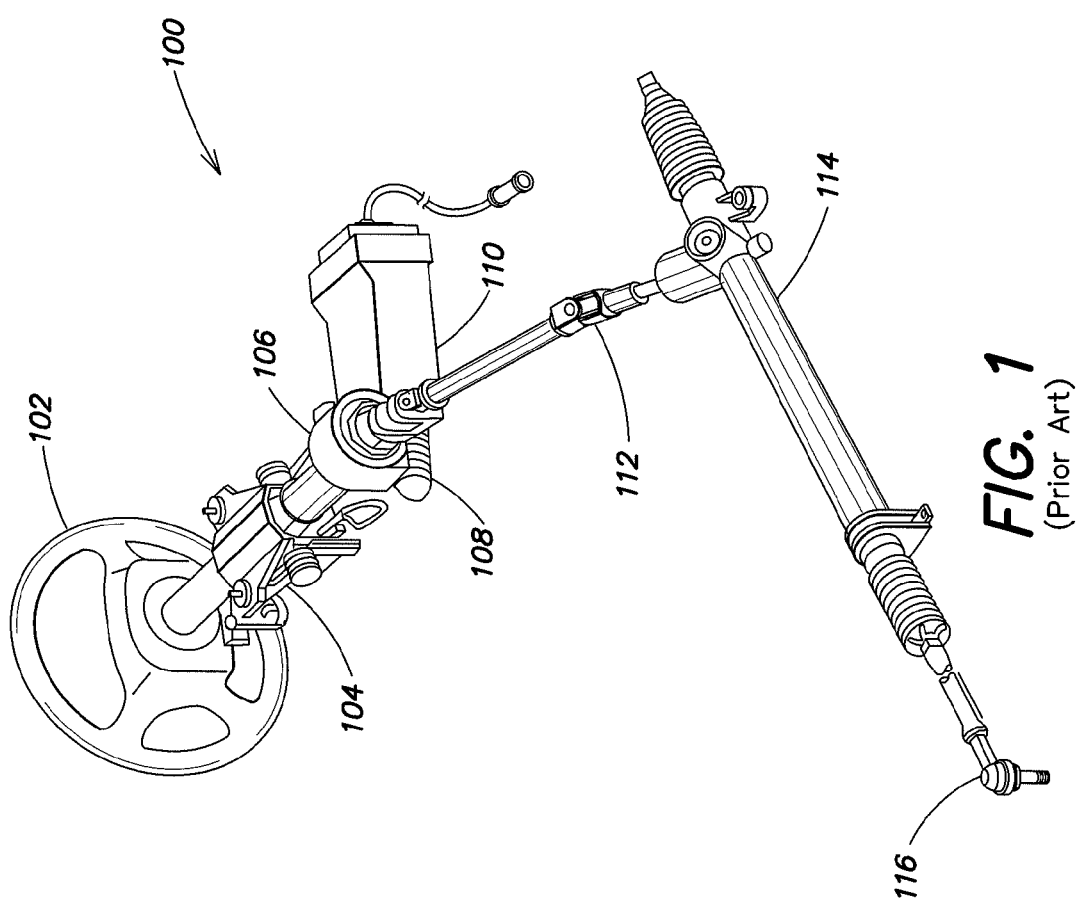
FIG. 1 is a pictorial illustration of an electromechanical power-assisted steering system having a worm gear mechanism.
Figure 4:
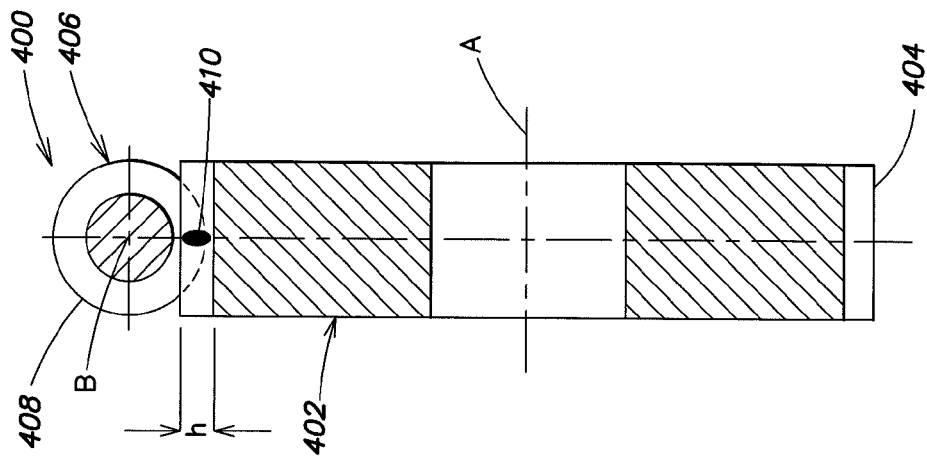
FIG. 4 is a section parallel to the worm gear axis through a worm gear mechanism according to the invention with a worm gear and a worm engaging with the worm gear.
Figure 3:
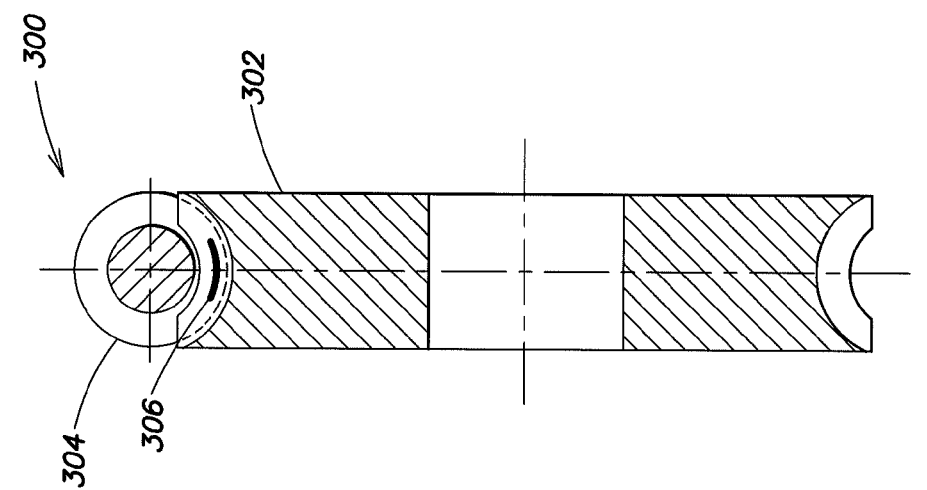
FIG. 3 is a section parallel to the worm gear axis through the worm gear mechanism of FIG. 1 with a globoidal worm gear and a worm with involute tooth pattern engaging with the worm gear.
Figure 2:
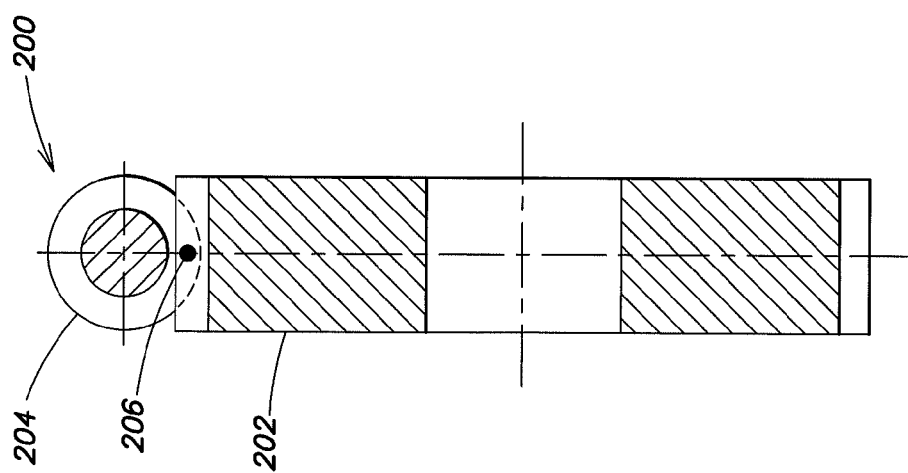
FIG. 2 is a section parallel to the worm gear axis through the worm gear mechanism of FIG. 1 with a cylindrical worm gear and a worm with involute tooth pattern engaging with the worm gear.

FIG. 4 illustrates a worm gear mechanism 400 in a section parallel to the rotation axis A of a worm gear 402. The worm gear 402 is cylindrical and has teeth 404 on its outer rim. A worm 406 rotates about an axis B that points perpendicularly to the drawing plane. The worm 406 is also cylindrical and has teeth 408 on its periphery. The teeth 404 of the worm gear 402 engage with the teeth 408 of the worm 406. The contact of the teeth 404 of the worm gear 402 with the teeth 408 of the worm 406 is identified as region 410. The contact region 410 extends substantially along height h of the teeth 404, 408 and is linear.

FIGS. 5A-5B illustrate the tooth geometry of the worm 406 and the worm gear 402 of FIG. 4. FIG. 5A shows the teeth 408 of the worm 406 pointing downward and the teeth 404 of the worm gear 402 pointing upward. The teeth 404, 408 engage with one another in this depiction as well. The teeth 404, 408 each have a height $h_4$, $h_5$, respectively. The height $h_4$ extends from a base 502 of the tooth 404 to its tip 504. The height $h_5$ extends from a base 506 of the tooth 408 to its tip 508. The width of the teeth 404, 408 varies over the height $h_4$, $h_5$, respectively, and depends on the shape of the faces 510, 512 of the teeth 404, 408, respectively. Encircled regions 514 each represent a region in which the teeth 404, 408 make contact when they engage with each other.

FIG. 5B is an enlarged detail view of a region in FIG. 5A in which a region near the tooth head of a worm tooth 408 makes contact with a region near the tooth base of a worm gear tooth 404. The surface along which the teeth 404, 408 contact has a height $h_1$. The tooth face 510 of the worm gear tooth 404 is concave in the region of contact. The region of the tooth face 512 of the worm gear 408 engaging with the tooth face 510 of the worm gear tooth 404 is made convex in shape. The two regions have a curvature that is similar or the same at least piecewise, so that they come into contact in a linear region. The effective profiles of the tooth faces 510, 512 of the worm gear tooth 404 and the worm tooth 408, respectively are adapted to each other throughout their height $h_4$, $h_5$, (FIG. 5A), so that linear contact occurs throughout the height $h_4$, $h_5$. In the exemplary embodiment depicted, the faces 510, 512 of teeth 404, 408 of the worm gear 402 and the worm 406 each have a concave profile in their region near the tooth base and a convex profile in their region near the tooth tip. With respect to their curvatures, the profiles are adapted to each other such that in each case regions with curvatures that are similar or equal, at least piecewise, come into contact when the teeth mesh.

Linear contact of the teeth has the advantage that the load to be transmitted from one gear to the other gear is distributed over an area, so that the load per unit area decreases. In this way, both the wear of the gears 402, 406 and also the danger of overloading are reduced. The load-bearing capacity of the gears 402, 406 is thus enhanced.

In one embodiment, the teeth 408 of the worm 406 are thinner than the teeth 404 of the worm gear 402. The worm 406 is made of a material with a greater strength, such as steel for example, while the worm gear 402 is made of a material with a lower strength, such as plastic for example. The lower load per unit area resulting from the fashioning of effective profiles 510, 512 has two advantages in this respect. The first is a substantial reduction in the wear of the worm gear 402, which is made of the material with lower strength. The second is that the thickness of the teeth 404, 408 can be optimized in view of the material pairing, so that the teeth need not be made thicker than necessary, with resulting material and hence cost savings.

Figure 6:
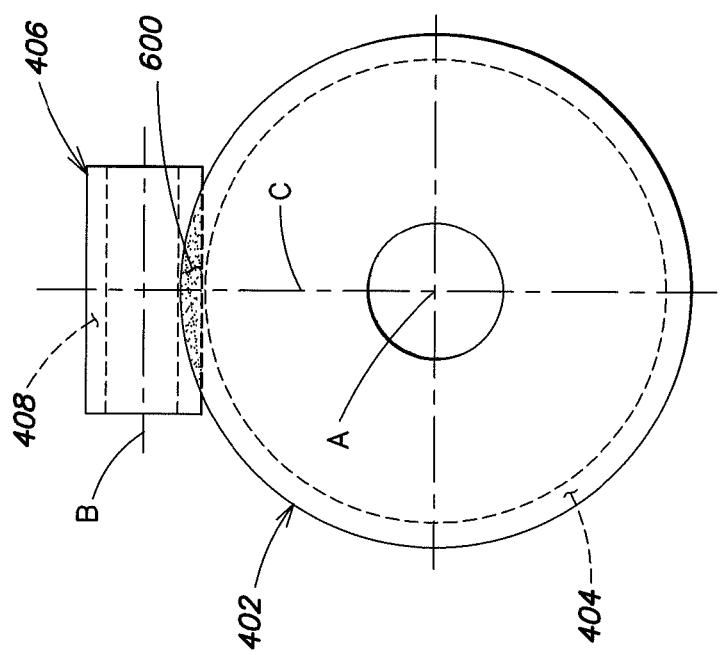
FIG. 6 is a section perpendicular to the worm gear axis through the worm gear mechanism of FIG. 4.

FIG. 6 shows the previously described worm gear mechanism according to an aspect of the invention with the cylindrical worm gear 402 and the cylindrical worm 406 in a section perpendicular to the rotation axis A of the worm gear 402. The rotation axis B of the worm 406 runs parallel to the drawing plane. The teeth 408, 404 of the worm 406 and the worm gear 402, respectively, again engage with one another. Reference character 600 identifies the region of engagement of the mutually engaging teeth 404, 408. Because of the shape of the worm gear 402 and the worm 406, the region of engagement 600 has its greatest extent in the direction of the height of the teeth at the height of a central axis C of the worm gear 402 and the worm 406. This extent decreases with increasing distance from the central axis C.

Figure 7:
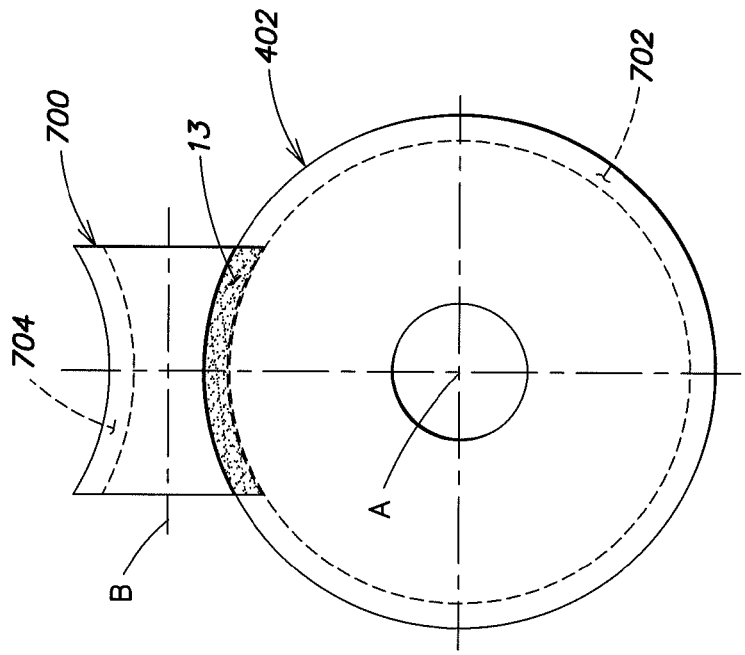
FIG. 7 is a section perpendicular to the worm gear axis through a worm gear mechanism with a globoidal worm.

In the case of the use of a globoidal worm 700 (i.e., a worm made so that region of engagement 13 has the same extent in the direction of the height of the teeth 702, 704 throughout its length), the region of engagement 13 can be made much larger as shown in FIG. 7 so that the contact area is increased over the width of the teeth 702, 704. The enlargement of the contact area has advantages with respect to the load-bearing capacity of gears, so that the advantages of the invention are increased by the use of the globoidal worm 700. In the exemplary embodiment of FIG. 6, the cylindrical worm gear 402 is still used, which has the advantage described in connection with the fabrication and assembly of gear mechanisms with a cylindrical worm gear.

Although the present invention has been shown and described with respect to several preferred embodiments thereof, various changes, omissions and additions to the form and detail thereof, may be made therein, without departing from the spirit and scope of the invention.

What is claimed is:

1. A worm gear mechanism for a power-assisted automobile steering mechanism, comprising:
    a rotatable cylindrical worm having a plurality of worm teeth that rotate about a first axis, each of the plurality of worm teeth having a first tooth face which includes a first convex region and a first concave region, where the first tooth face is disposed between a tip and a base; and
    a rotatable cylindrical worm gear having a plurality of worm gear teeth that rotate about a second axis, each of the plurality of worm gear teeth having a second tooth face which includes a second concave region and a second convex region, where the second tooth face is disposed between a tip and a base;
    where the first axis and the second axis are substantially perpendicular;
    where the rotatable cylindrical worm and the rotatable cylindrical worm gear mesh together in a first configuration such that the first tooth face and the second tooth face define a linear contact along one of a plurality of portions of a linear contact region that extends between the base of the worm gear tooth and the tip of the worm gear tooth.

2. The worm gear mechanism of claim 1, where the first convex region and the second concave region have a substantially equal first curvature.

3. The worm gear mechanism of claim 1, where the first concave region and the second convex region have a substantially equal second curvature.

4. The worm gear mechanism of claim 1, where the second concave region is disposed in a region adjoining the base of each worm gear tooth and the second convex region is disposed in a region adjoining the tip of each worm gear tooth.

5. The worm gear mechanism of claim 1, where thicknesses of the teeth of the worm and worm gear are adapted to the material properties of the worm and worm gear.

6. The worm gear mechanism of claim 5, where the thickness of the teeth of the worm is greater than the thickness of the teeth of the worm gear.

7. The worm gear mechanism of claim 1, where the first tooth face and the second tooth face have a profile containing no involutes.

8. The worm gear mechanism of claim 1, where the worm is metallic and the worm gear is plastic.

9. The worm gear mechanism of claim 1, where each tooth of the worm and worm gear has a concave surface face profile in a region near a base of the tooth and a convex surface face profile in a region near a tip of the tooth.

10. A worm gear assembly, comprising:
    a worm with a plurality of worm teeth that rotate about a first axis; and
    a worm gear with a plurality of worm gear teeth that rotate about a second axis;
    where each tooth of the worm and each tooth of the worm gear has a concave profile in a region near a base of the tooth and a convex profile in a region near a tip of the tooth, where the region near the base of the tooth is closer to the base of the tooth than the tip of the tooth, and where the region near the tip of the tooth is closer to the tip of the tooth than the base of the tooth;
    where the worm and the worm gear mesh together in a first configuration such that one of the plurality of worm teeth and one of the plurality of worm gear teeth define a linear contact along one of a plurality of portions of a linear contact region extending between the base of the worm and the tip of the worm.

11. The gear assembly of claim 10, where the worm is metallic and the worm gear is plastic.

12. A worm gear assembly, comprising:
    a first gear having a plurality of first teeth each having a first tooth face that rotate about a first axis, each of the first tooth faces having a first profile including a first and a second linear contact surface; and
    a second gear having a plurality of second teeth each having a second tooth face that rotate about a second axis, each of the second tooth faces having a second profile including a third and a fourth linear contact surface;
    where the first and the second gears mesh together such that the first linear contact surface of one of the plurality of the first teeth linearly contacts the third linear contact surface of one of the plurality of the second teeth along one of a plurality of portions of a linear contact region; and
    where the first profile and the second profile extend the linear contact region radially through the first, the second, the third and the fourth linear contact surfaces.

13. A gear mechanism for power-assisted automobile steering, comprising:
    a rotatable first gear having a plurality of first gear teeth configured to rotate about a first axis, each of the plurality of first gear teeth having a first tooth face disposed between a tip and a base, where the first tooth face includes a first lower linear contact surface having a first profile; and a first upper linear contact surface having a second profile; and a rotatable second gear having a plurality of second gear teeth configured to rotate about a second axis, each of the plurality of second gear teeth having a second tooth face disposed between a tip and a base, where the second tooth face includes a second lower linear contact surface having a third profile adapted to the second profile; and a second upper linear contact surface having a fourth profile adapted to the first profile;

where the first gear and the second gear mesh together such that the first lower linear contact surface of one of the plurality of the first gear teeth linearly contacts the second upper linear contact surface of one of the plurality of the second gear teeth and the first upper linear contact surface of another one of the plurality of the first gear teeth linearly contacts the second lower linear contact surface of another one of the plurality of the second gear teeth; and where the linear contact extends radially along the surface of the contacted teeth.

* * * * *